United States Patent [19]
Oleck et al.

[11] Patent Number: 4,601,998
[45] Date of Patent: Jul. 22, 1986

[54] METHOD AND CATALYST FOR REMOVING CONTAMINANTS FROM HYDROCARBONACEOUS FLUIDS USING A COPPER-GROUP VIA METAL-ALUMINA CATALYST

[75] Inventors: Stephen M. Oleck, Moorestown; Quang N. Le, Westville; Daniel J. Neuman, Cherry Hill, all of N.J.

[73] Assignee: Mobil Oil Corporation, New York, N.Y.

[21] Appl. No.: 723,694

[22] Filed: Apr. 16, 1985

Related U.S. Application Data

[62] Division of Ser. No. 524,064, Aug. 17, 1983, Pat. No. 4,539,001.

[51] Int. Cl.$^4$ .................. B01J 23/28; B01J 23/72
[52] U.S. Cl. .................. 502/318; 502/322
[58] Field of Search ............ 502/216, 305, 318, 321, 502/322

[56] References Cited

U.S. PATENT DOCUMENTS

| | | | |
|---|---|---|---|
| 2,402,626 | 8/1940 | Howk | 502/216 |
| 2,753,310 | 7/1956 | Riedl | 502/321 |
| 3,417,145 | 12/1968 | Nemel et al. | 502/318 |
| 3,532,457 | 10/1970 | Koepernik | 502/318 |
| 3,646,143 | 2/1972 | Ellis et al. | 502/318 |
| 3,663,431 | 5/1972 | Wagner | 502/216 |
| 3,751,386 | 8/1973 | Koberstein et al. | 502/318 |
| 3,870,658 | 3/1975 | Farrauto et al. | 502/318 |
| 4,168,276 | 9/1979 | Finch | 502/318 |
| 4,451,579 | 5/1984 | Lemanski et al. | 502/318 |
| 4,539,101 | 9/1985 | Oleck et al. | 208/251 H |

FOREIGN PATENT DOCUMENTS 0793641  1/1981  U.S.S.R. ............. 502/318

Primary Examiner—Andrew H. Metz
Assistant Examiner—Anthony McFarlane
Attorney, Agent, or Firm—Alexander J. McKillop; Michael G. Gilman; Charles J. Speciale

[57] ABSTRACT

There is provided a method and catalyst for removing catalyst-poisoning impurities or contaminants such as arsenic, iron and nickel from hydrocarbonaceous fluids, particularly shale oil and fractions thereof. More particularly there is provided a method of removal of such impurities by contacting the fluids with a copper-Group VIA metal-alumina catalyst. For example, a copper-molybdenum-alumina catalyst may be used as a guard bed material in a step preceding most refining operations, such as desulfurization, denitrogenation, catalytic hydrogenation, etc.

2 Claims, 4 Drawing Figures

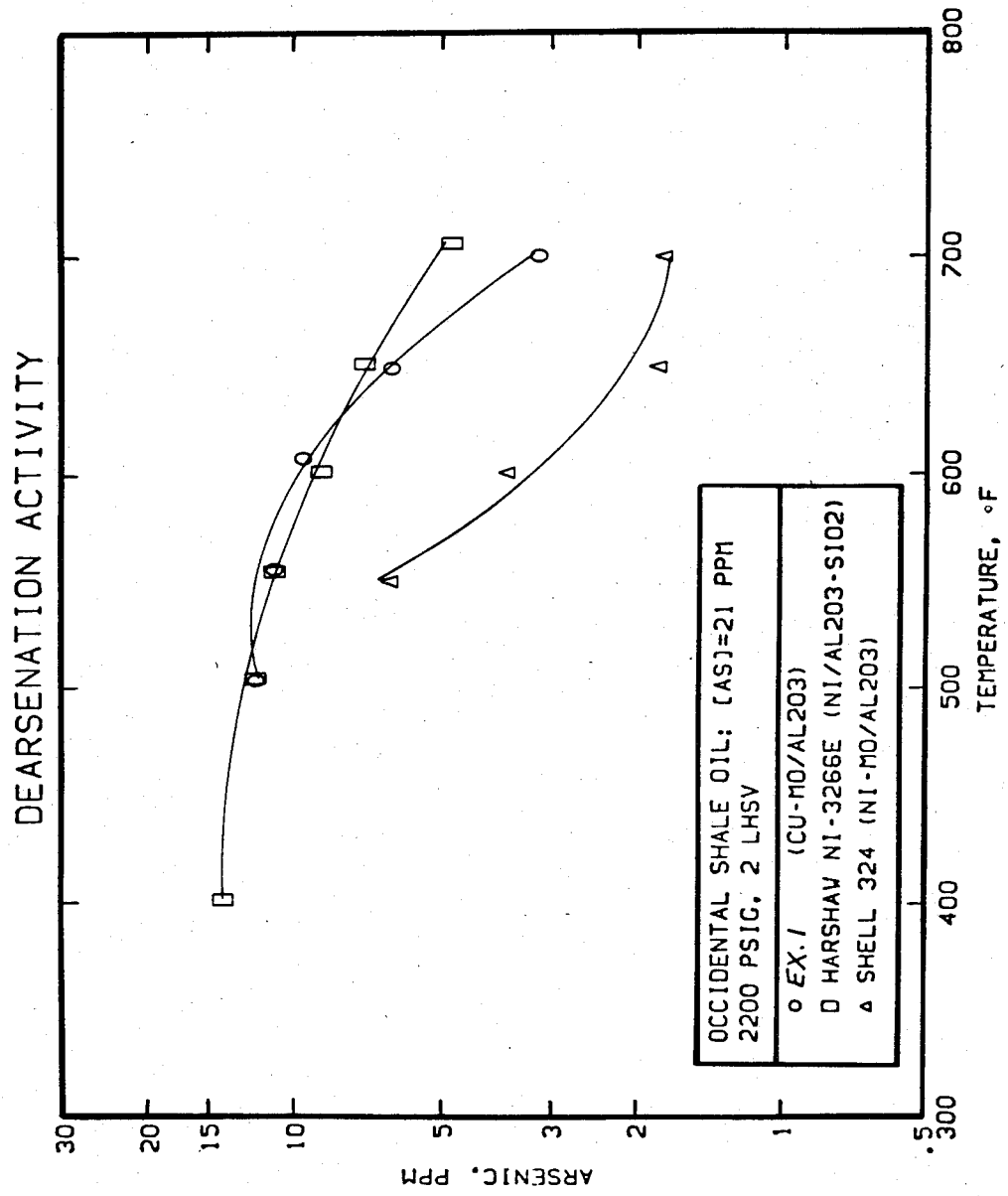

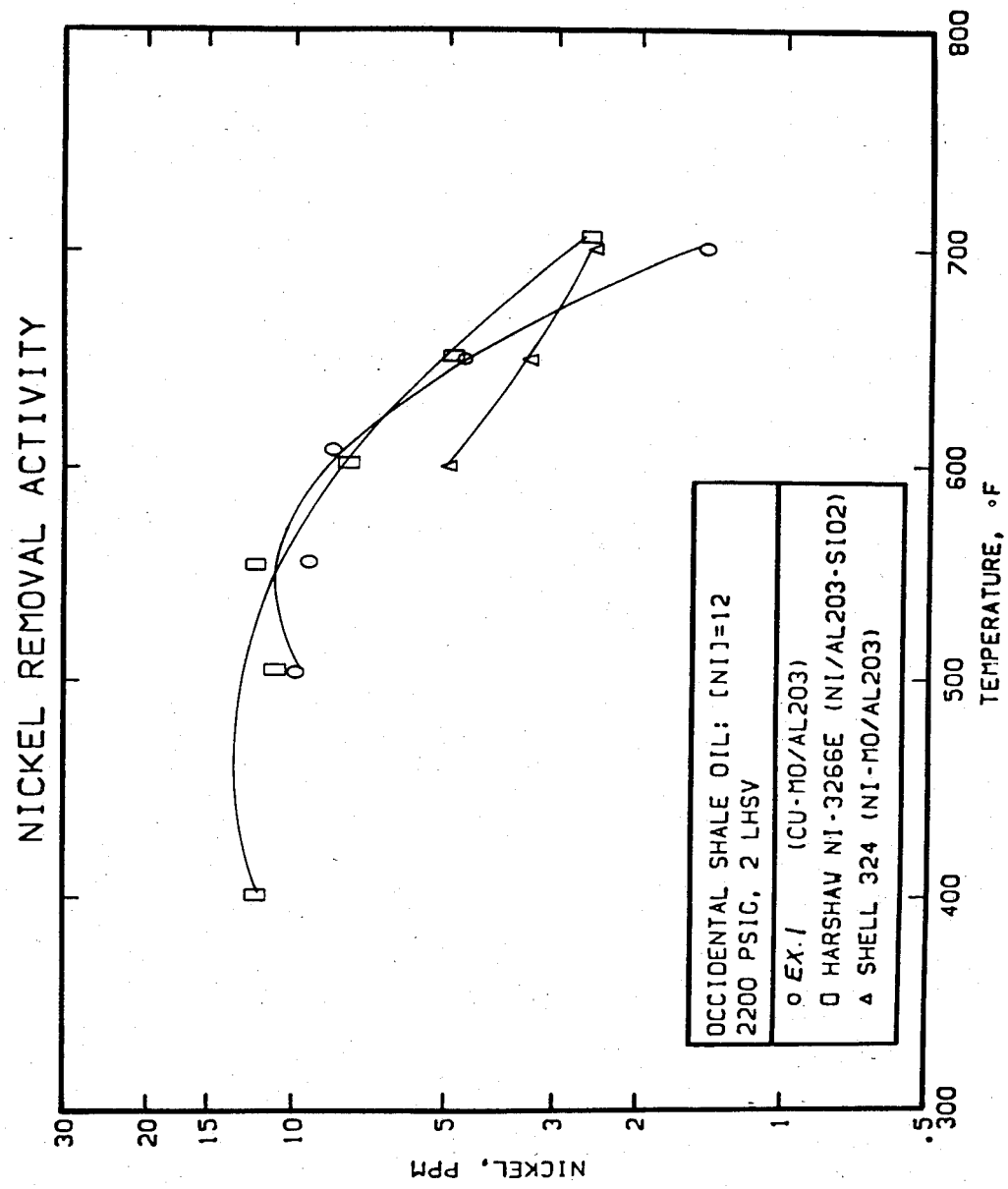

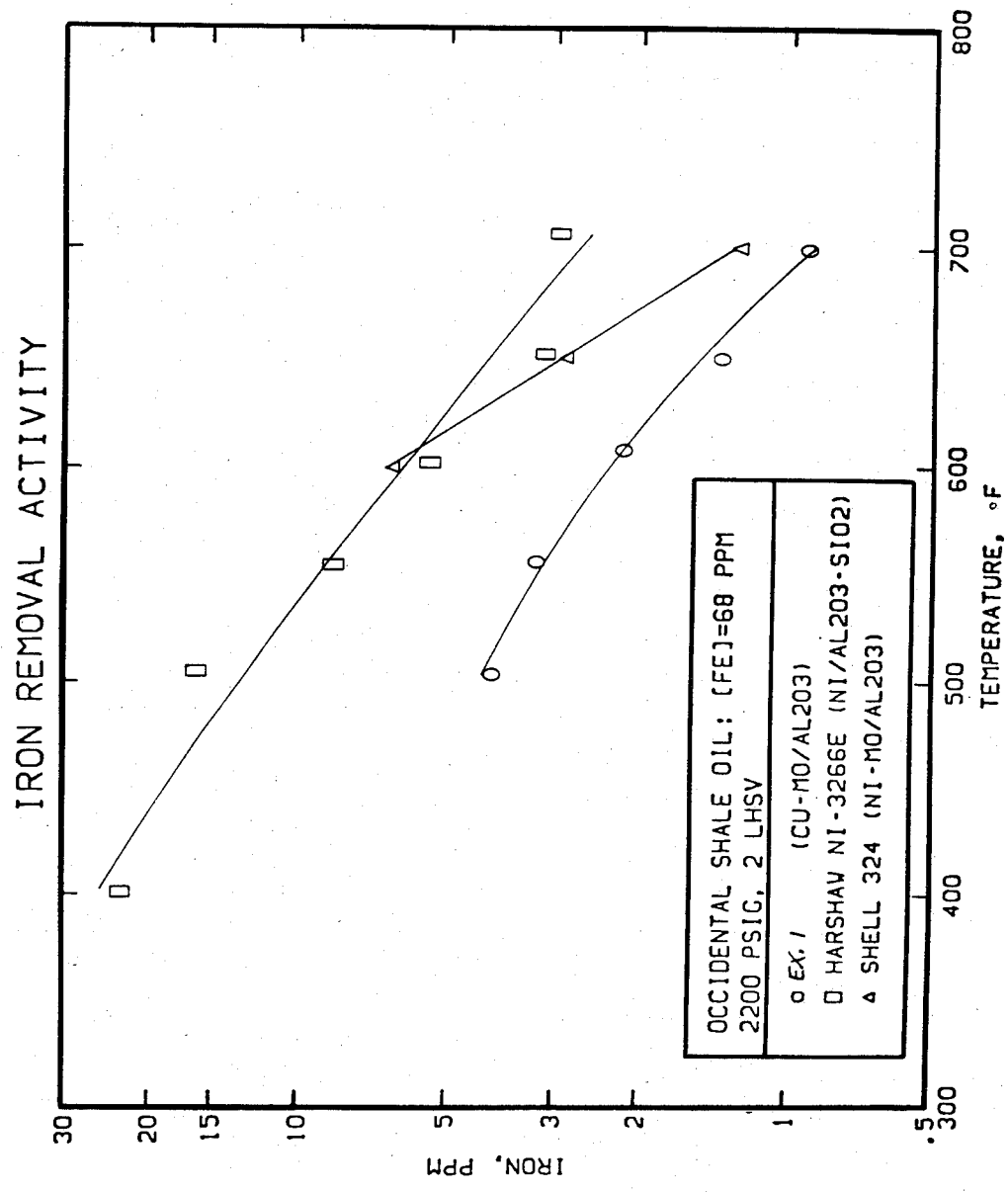

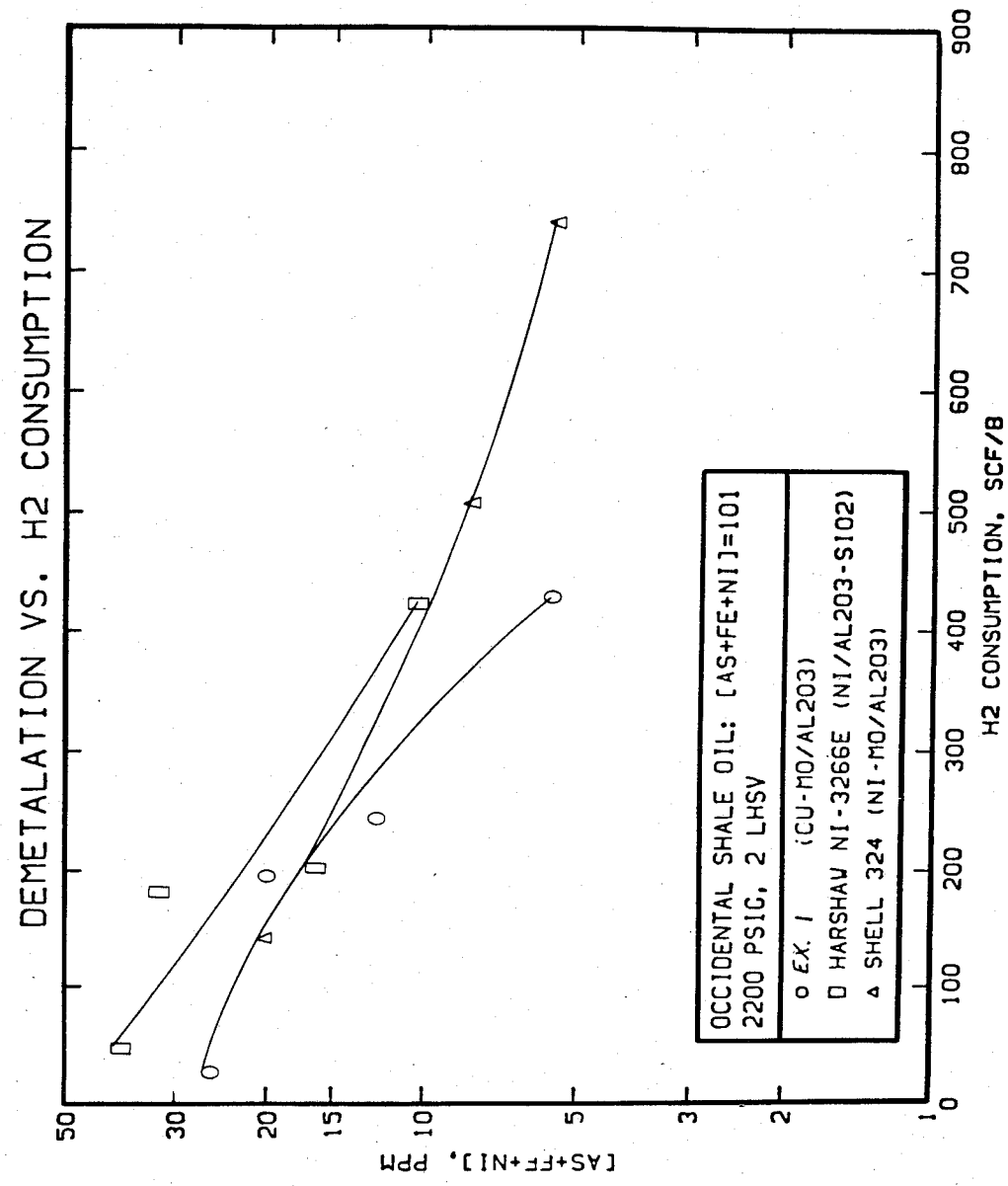

METHOD AND CATALYST FOR REMOVING CONTAMINANTS FROM HYDROCARBONACEOUS FLUIDS USING A COPPER-GROUP VIA METAL-ALUMINA CATALYST

This is a divisional of copending application Ser. No. 524,064, filed on Aug. 17, 1983 and now U.S. Pat. No. 4,539,001.

BACKGROUND OF THE INVENTION

This invention relates to a method and catalyst for removing catalyst-poisoning impurities or contaminants such as arsenic, iron and nickel from hydrocarbonaceous fluids, particularly shale oil and fractions thereof. More particularly, the invention relates to a method of removal of such impurities by contacting the fluids with a copper-Group VIA metal-alumina catalyst. The catalyst may be used as a guard bed material in a step preceding most refining operations, such as desulfurization, denitrogenation, catalytic hydrogenation, etc.

Due to scarcity of other hydrocarbon fuels and energy resources in general, shale oil and other hydrocarbonaceous fluids such as those derived from coal, bituminous sands, etc., are expected to play an increasing role in the production of commercial hydrocarbon fuels in the future. Substantial effort has been devoted to the development of cost-efficient refining techniques for the processing of these hydrocarbonaceous fluids. Frequently, these fluids contain contaminants that poison and deactivate expensive and sensitive upgrading catalysts used in hydrogenation and other refining steps to which these hydrocarbonaceous fluids must be subjected before they can be satisfactorily used as sources of energy. In addition, the removal of contaminants such as arsenic may be necessary for environmental protection if the hydrocarbonaceous fluids are employed as fuels, as these contaminants form poisonous compounds.

The prior art has included several methods of removing arsenic from hydrocarbonaceous fluids, such as that described in U.S. Pat. No. 2,778,779 to Donaldson issued on June 14, 1952. Such methods have included the use of metal oxides to remove arsenic from streams of naturally occurring crude oil.

Other processes have been developed for the removal of arsenic present in the parts per billion range from naphthas in order to protect sensitive reforming catalysts. Unfortunately, such processes cannot be applied to shale and other hydrocarbonaceous fluids which often have arsenic concentrations as high as 60 ppm.

Also known, are washing processes employing aqueous caustic solutions to precipitate arsenic salts from the hydrocarbonaceous fluid and extract them into the aqueous phase. See, e.g. U.S. Pat. No. 2,779,715 to Murray issued on Jan. 29, 1957 and D. J. Curtin et al, "Arsenic and Nitrogen Removal during Shale Oil Upgrading", A.C.S. Div. Fuel Chem., No. 23(4), 9/10-15/78. These processes, however, are relatively expensive, cause a substantial amount of fluid to be lost to the aqueous phase, contaminate the hydrocarbon fluid with aqueous solution and present a problem with regard to the disposal of waste caustic solution.

Many patents have issued which are directed to use of a metallic oxide and/or sulfide catalyst such as iron, nickel, cobalt or molybdenum oxide or sulfide or composites thereof on an alumina carrier to remove arsenic and other contaminants from shale oil. See, e.g. U.S. Pat. No. 4,003,829 to Burget et al issued on Jan. 18, 1977, U.S. Pat. No. 4,141,820 to Sullivan issued on Feb. 27, 1979 and U.S. Pat. No. 3,954,603 to Curtin, U.S. Pat. No. 3,804,750 to Myers and U.S. Pat. No. 4,046,674 to Young. While these processes are effective, they employ relatively sophisticated and relatively expensive catalysts which considerably contribute to the processing costs of shale oil.

U.S. Pat. No. 4,354,927 to Shih et al issued on Oct. 19, 1982 describes the removal of catalyst poisoning contaminants such as arsenic and selenium from hydrocarbonaceous fluids particularly shale oil by contact with high-sodium alumina in the presence of hydrogen; saturation of conjugated diolefins is also effected.

Japan Pat. Nos. 5,6095-985; 5,6092-991; and 5,4033,503 to Chiyoda Chemical Engineering Company of Japan describe Group IB catalysts for demetalation; however, these utilize specific supports (not alumina).

The Bearden, Jr. et al U.S. Pat. No. 4,051,015 describes a copper chloride demetalation catalyst.

OBJECTS

It is an object of this invention to provide an improved catalyst and method for removing arsenic from hydrocarbonaceous fluids such as shale oil.

It is another object of this invention to provide an improved catalyst and method for removing arsenic from a hydrocarbonaceous fluid having a relatively high arsenic content.

It is a further object of this invention to provide a catalyst and process for removal of arsenic which does not entail use of an aqueous phase and mixing of said aqueous phase with the hydrocarbon.

It is yet another object of this invention to provide an improved catalyst and method for removing arsenic and other contaminants from hydrocarbonaceous fluids, which method is inexpensive and does not substantially contribute to the processing cost of the fluids.

These and other objects will become apparent from the specification which follows.

SUMMARY

In accordance with one aspect of the invention, there is provided a method for reducing the content of at least one of arsenic, iron and nickel in a hydrocarbonaceous fluid by contacting the fluid with a particulate catalyst consisting essentially of an oxide or sulfide of copper and an oxide or sulfide of a Group VIA metal on a porous alumina support in the presence of hydrogen under sufficient metal reducing conditions. Such metal reducing conditions may involve, e.g., a temperature ranging from about 400° to 900° F., a pressure ranging from about 100 to 3000 psig, and a LHSV of from about 0.1 to 10. By means of the metal reducing process of the present invention, a relatively small amount of hydrogen may be consumed while removing a relatively large amount of metals.

According to another aspect of the invention, there is provided a particulate catalyst consisting essentially of an oxide or sulfide of copper and an oxide or sulfide of a Group VIA metal on a porous alumina support, wherein the total weight of the oxides or sulfides of copper and the oxides or sulfides of the Group VIA metal are present in an amount ranging from about 20 to 75 weight percent, based on the total catalyst, the remainder of the catalyst being essentially alumina. This catalyst is particularly suitable for reducing the content of at least one of arsenic, iron and nickel in a hydrocarbonaceous fluid by contacting the fluid with the catalyst in the presence of hydrogen under sufficient metal reducing conditions.

BRIEF DESCRIPTION OF THE DRAWINGS

FIG. 1 is a graph showing the removal of arsenic from shale oil by a copper-molybdenum-alumina catalyst as compared with other demetalation catalysts.

FIG. 2 is a graph showing the removal of nickel from shale oil by a copper-molybdenum-alumina catalyst as compared with other demetalation catalysts.

FIG. 3 is a graph showing the removal of iron from shale oil by a copper-molybdenum-alumina catalyst as compared with other demetalation catalysts.

FIG. 4 is a graph showing demetalation vs. hydrogen consumption for shale oil with a copper-molybdenum-alumina catalyst as compared with other demetalation catalysts.

DETAILED DESCRIPTION

The Group VIA metals referred to herein correspond to the elements of Group VIA of the Periodic Chart of the Elements. The Periodic Chart referred to herein is that version officially approved by the United States National Bureau of Standards (NBS) and the International Union of Pure and Applied Chemists (IUPAC), the elements of Group VIA being chromium (Cr), molybdenum (Mo) and tungsten or wolfram (W). Preferred Group VIA metals are molybdenum and tungsten, especially molybdenum.

Examples of preferred catalysts according to the present invention contain from about 20 to 65, most especially 38 to 46, weight percent CuO and from about 4 to 12, most especially 7 to 9 weight percent $MoO_3$. Catalysts in accordance with the present invention may have a pore volume within the range of about 0.4 cc/g and 0.8 cc/g and a surface area within the range of 150 to 250 m$^2$/g.

By way of example, retorted shale oil can be partially upgraded by contacting the demineralized ("desalted") oil with a CuMo/$Al_2O_3$ guard chamber catalyst in the presence of hydrogen at temperatures of 500°-700° F. In this process, a 42 wt. % copper oxide; 8 wt. % molybdena on alumina catalyst shows demetalation activity equal to or better than conventional hydrotreating catalysts, but requires less hydrogen consumption. As discussed more fully hereinafter, the catalyst has higher nickel removal activity than other (nickel-containing) catalysts. This may be especially significant for in-situ derived shale oils which tend to have higher nickel contents than conventionally retorted oils. Since the catalyst has some hydrogenation activity, it effectively lowers the conjugated diolefin content at mild conditions—something that a Ni/$Al_2O_3$ or Cu/$Al_2O_3$ catalyst cannot achieve if the feedstock is high in sulfur ($\geq 0.5$ wt. %).

Retorted shale oil contains a large number of trace metals such as As, Fe, Ni, V, Co, Se and Zn; As and Fe are the predominant trace elements (>20 ppm). These metals present several processing and product problems:

some arsenic compounds in shale oil are water soluble and can cause pipeline corrosion;

when shale oil is upgraded by delayed coking, most of the metals are rejected in the coke, resulting in a lower quality coke;

upgrading catalysts are irreversibly poisoned by metals deposition;

when burned directly as a fuel, shale oil has potential $As_2O_3$ emission problems.

As mentioned previously, there are many methods reported in the literature for arsenic removal, adsorption, extraction, thermal treatment, and chemical additives. Relative to metals in petroleum, arsenic in shale oil is very reactive. Commercial hydrotreating catalysts, when fresh, can easily reduce the arsenic and other metals in shale oil to less than 0.1 ppm under normal hydrotreating conditions (T$\geq$725° F. and LHSV$\leq$0.8). Since metals poison the catalyst's hydrotreating activity, upstream metals removal is preferred.

Most guard chamber operations are carried out in the presence of hydrogen. Although arsenic removal is relatively insensitive to hydrogen partial pressure (i.e. k $\alpha$ $(P/P_o)^{0.4}$) in the 400-2200 psi range, plugging problems have been encountered at lower pressures (<1000 psi). The major catalysts—nickel, cobalt, iron or copper—have poor hydrogenative activity at lower temperatures ($\leq$400° F.) and consequently, cannot eliminate the fouling problems.

The invention may be practiced in a guard bed chamber preferably having a fixed bed of porous particulate material, but a moving bed may also be used. An example of such a particulate material is a copper-molybdenum-alumina catalyst.

The guard bed may be situated in a guard chamber, a closed metal vessel capable of being pressurized. The particles must be capable of promoting deposition of the contaminants thereon when contacted by the hydrocarbonaceous feed under a reducing atmosphere provided by hydrogen at a pressure between 100 and 3000 psig, preferably between 400 and 2500 psig, and at a temperature between 400° and 900° F., preferably between 500° and 750° F.

The hydrocarbonaceous feed is preferably admixed with hydrogen at a ratio ranging from 1000 to 10,000 standard cubic feet (scf) of $H_2$ per barrel (b) of feed and preferably 2000 to 5000 scf of $H_2$/b of feed and the admixed feed is contacted with the particles for a time sufficient to reduce the arsenic and other contaminant content to acceptable levels.

The quantity of material in the guard bed should be sufficient to keep the Liquid Hourly Space Velocity (LHSV), measured in units of volumetric flow rate of feed per unit volume of catalyst, between the values of 0.1 and 10 and preferably between those of 0.5 and 3. This LHSV range corresponds to a residence time for the feed in the guard bed ranging between 0.1 and 10 hours and preferably 0.3 to 2 hours.

The invention may be further illustrated by the Examples which follow:

EXAMPLE 1

Catalyst Preparation

[42% CuO-8% $MoO_3$-50% $Al_2O_3$]

A catalyst was prepared in the following manner: 211 ml. of solution containing 73.0 grams ammonium heptamolybdate (81.5% $MoO_3$) were blended in a muller-mixer with 535 grams of alpha alumina monohydrate powder, a product commercially available as Kaiser Substrate Alumina (SA) from Kaiser Chemicals. Then 454 grams of cupric carbonate (68.85% CuO) were blended into the mixture, after which 200 ml. water were added. The mixture was extruded to one-thirty second inch diameter cylinders, dried at 250° F. and calcined two hours at 800° F.

The catalyst had the following properties:

| Density, g/cc | |
|---|---|
| Packed | 0.73 |
| Particle | 1.41 |
| Real | 4.57 |
| Pore Volume (PV), cc/g | 0.489 |
| Surface Area, m/g | 208 |
| Avg. Pore Diameter, Å | 94 |
| Pore Size Distribution % of PV in Pores of | |
| 0–50Å Diameter | 17 |
| 50–100 | 22 |
| 100–150 | 21 |
| 150–200 | 23 |
| 200–300 | 11 |
| 300+ | 6 |

EXAMPLE 2

The catalyst of Example 1 was used in five runs for the demetalation of Occidental Shale Oil. Data for this example are shown in Table 1.

TABLE 1

Demetalation of Occidental Shale Oil over (CuMo/Al$_2$O$_3$)

| | CHG | 1 | 2 | 3 | 4 | 5 |
|---|---|---|---|---|---|---|
| Reactor Conditions | | | | | | |
| Temperature, °F. | — | 504 | 556 | 608 | 650 | 701 |
| Pressure, psig | — | 2200 | 2200 | 2200 | 2200 | 2200 |
| LHSV, vff/hr/vcat | — | 1.8 | 1.8 | 1.8 | 1.9 | 2.0 |
| Days on Stream | — | 1.3 | 2.1 | 2.9 | 3.6 | 4.4 |
| TLP Properties | | | | | | |
| Gravity, °API | 23.0 | 23.2 | 24.6 | 24.8 | 25.1 | 26.4 |
| Hydrogen, wt. % | 12.04 | 12.10 | 12.40 | 12.35 | 12.41 | 12.70 |
| Nitrogen, wt. % | 1.61 | 1.47 | 1.46 | 1.35 | 1.32 | 1.29 |
| Sulfur, wt. % | 0.67 | 0.57 | 0.52 | 0.50 | 0.37 | 0.25 |
| Arsenic, ppm | 20.0 | 12.0 | 11.0 | 9.6 | 6.4 | 3.3 |
| Iron, ppm | 68.0 | 4.1 | 3.3 | 2.2 | 1.4 | 0.9 |
| Nickel, ppm | 11.0 | 10.0 | 9.4 | 8.4 | 4.7 | 1.5 |
| H$_2$ Consumption, scf/b | — | 28 | — | 197 | 244 | 429 |

Three catalysts are compared for processing Occidental shale oil. Shell 324 and Harshaw Ni-3266E are feld to be relatively active commercial catalysts for demetalation. Key results are shown in FIGS. 1–4. The results indicate:

The catalyst of Example 1 is less active than Shell 324 for dearsenation, but more active than Harshaw Ni-3266E;

The catalyst of Example 1 is more active than the other catalysts for iron and nickel removal. The approximate 100° F. improvement in iron removal activity is especially significant as iron is the most predominant trace metal in shale oil. Nickel removal is especially important for in-situ generated shale oils which tend to have higher nickel concentrations.

The demetalation/hydrogen consumption selectivity of the catalyst of Example 1 is better than Harshaw Ni-3266E or Shell 324. The selectivity could probably be improved by optimizing the molybdenum content in the catalyst of Example 1.

About 70% of the arsenic removed was retained on the catalyst. This is similar to the amount retained on nickel-containing catalysts. The arsenic compounds are speculated to be reacting with the copper to form stable complexes. Copper-arsenic complexes are abundant in nature (e.g., enargite-3CuS.As$_2$S$_5$) and are often a by-product of copper smelting operations. (Note Kirk-Othmer, *Encyclopedia of Chemical Technology*, Second Edition, Vol. 2, p. 721.

Features of the process of the present invention include the following:

Uses copper-Group VIA metal-alumina catalyst for demetalation.

Retains arsenic on catalyst-probably in the form of copper-arsenic complexes.

Has higher iron and nickel removal activities than nickel-containing demetalation catalysts.

Although the invention has been described in conjunction with specific embodiments thereof, it is evident that many alternatives and variations will be apparent to those skilled in the art in light of the foregoing description. Accordingly, it is intended to embrace all such alternatives and variations that fall within the spirit and scope of the appended claims.

What is claimed is:

1. A particulate catalyst for dearsenating and demetallizing a hydrocarbonaceous fluid consisting essentially of from about 38 to 46 weight percent CuO and 7 to 9 weight percent MoO$_3$ on a porous alumina support, wherein the total weight of the CuO and the MoO$_3$ are present in an amount ranging from about 20 to 75 weight percent, based on the total catalyst, the remainder of the catalyst being essentially alumina.

2. The catalyst of claim 1 which has a pore volume within the range of about 0.4 cc/g and 0.8 cc/g and a surface area within the range of 150 to 250 m$^2$/g.

* * * * *